US011916263B2

(12) United States Patent
Gasda et al.

(10) Patent No.: US 11,916,263 B2
(45) Date of Patent: Feb. 27, 2024

(54) CROSS-FLOW INTERCONNECT AND FUEL CELL SYSTEM INCLUDING SAME

(71) Applicant: BLOOM ENERGY CORPORATION, San Jose, CA (US)

(72) Inventors: Michael Gasda, Mountain View, CA (US); Vijay Srivatsan, Sunnyvale, CA (US); Robert M. Hintz, San Jose, CA (US); Swaminathan Venkataraman, Cupertino, CA (US); Padiadpu Shankara Anantha, Bangalore (IN); Emad El Batawi, Sunnyvale, CA (US); Cheng-Yu Lin, Cupertino, CA (US); Sagar Mainkar, Sunnyvale, CA (US); Gilbert Richards, San Jose, CA (US); Jonathan Scholl, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/662,956

(22) Filed: May 11, 2022

(65) Prior Publication Data

US 2022/0278341 A1    Sep. 1, 2022

Related U.S. Application Data

(63) Continuation of application No. 16/424,930, filed on May 29, 2019, now Pat. No. 11,355,762.
(Continued)

(51) Int. Cl.
*H01M 8/0247* (2016.01)
*H01M 8/2425* (2016.01)
(Continued)

(52) U.S. Cl.
CPC ....... *H01M 8/0247* (2013.01); *H01M 8/0258* (2013.01); *H01M 8/2425* (2013.01); *H01M 2008/1293* (2013.01)

(58) Field of Classification Search
CPC . H01M 8/0247; H01M 8/0258; H01M 8/2425
See application file for complete search history.

(56) References Cited

U.S. PATENT DOCUMENTS 4,997,726 A    3/1991    Akiyama et al.
5,942,349 A    8/1999    Badwal et al.
(Continued)

FOREIGN PATENT DOCUMENTS

CN    1493092 A    4/2004
CN    101796680 A    8/2010
(Continued)

OTHER PUBLICATIONS

Notification of Transmittal of the International Search Report and Written Opinion of the International Search Authority for International Patent Application No. PCT/US2019/034283, dated Oct. 1, 2019, 10 pages.
(Continued)

*Primary Examiner* — Jimmy Vo
(74) *Attorney, Agent, or Firm* — THE MARBURY LAW GROUP PLLC (57) ABSTRACT

A cross-flow interconnect and a fuel cell stack including the same, the interconnect including fuel inlets and outlets that extend through the interconnect adjacent to opposing first and second peripheral edges of the interconnect; an air side; and an opposing fuel side. The air side includes an air flow field including air channels that extend in a first direction, from a third peripheral edge of the interconnect to an opposing fourth peripheral edge of the interconnect; and riser seal surfaces disposed on two opposing sides of the air
(Continued)

flow field and in which the fuel inlets and outlets are formed. The fuel side includes a fuel flow field including fuel channels that extend in a second direction substantially perpendicular to the first direction, between the fuel inlets and outlets; and a perimeter seal surface surrounding the fuel flow field and the fuel inlets and outlets.

11 Claims, 6 Drawing Sheets

Related U.S. Application Data (60) Provisional application No. 62/678,362, filed on May 31, 2018.

(51) Int. Cl.
*H01M 8/0258* (2016.01)
*H01M 8/12* (2016.01)

(56) References Cited

U.S. PATENT DOCUMENTS

| | | | |
|---|---|---|---|
| 6,106,967 A | 8/2000 | Virkar et al. | |
| 6,296,962 B1 | 10/2001 | Minh | |
| 8,067,129 B2 | 11/2011 | Couse | |
| 8,110,319 B2 | 2/2012 | Nguyen et al. | |
| 8,268,502 B2 | 9/2012 | Nguyen et al. | |
| 8,445,157 B2 | 5/2013 | Nguyen et al. | |
| 8,785,074 B2 | 7/2014 | Edmonston et al. | |
| 8,852,825 B2 | 10/2014 | Batawi et al. | |
| 8,986,905 B2 | 3/2015 | McElroy et al. | |
| 9,065,127 B2 | 6/2015 | Gottmann et al. | |
| 9,246,184 B1 | 1/2016 | Batawi et al. | |
| 9,368,810 B2 | 6/2016 | Darga et al. | |
| 9,452,475 B2 | 9/2016 | Armstrong et al. | |
| 9,461,314 B2 | 10/2016 | McElroy | |
| 9,468,736 B2 | 10/2016 | Darga et al. | |
| 9,570,769 B2 | 2/2017 | Couse et al. | |
| 9,583,771 B2 | 2/2017 | Parihar et al. | |
| 9,634,335 B2 | 4/2017 | Ashary | |
| 9,673,457 B2 | 6/2017 | Srivatsan et al. | |
| 9,993,874 B2 | 6/2018 | Shivanath et al. | |
| 10,079,393 B1 | 9/2018 | Verma et al. | |
| 10,763,533 B1 | 9/2020 | El Batawi et al. | |
| 2002/0055028 A1 | 5/2002 | Ghosh et al. | |
| 2004/0137299 A1 | 7/2004 | Mazza et al. | |
| 2004/0185321 A1 | 9/2004 | Sutherland et al. | |
| 2006/0019813 A1* | 1/2006 | Yoshii | C03C 8/02 501/15 |
| 2006/0204828 A1* | 9/2006 | Petrovic | H01M 8/0297 428/688 |
| 2008/0193825 A1 | 8/2008 | Nguyen et al. | |
| 2009/0136821 A1 | 5/2009 | Gottmann et al. | |
| 2009/0253017 A1* | 10/2009 | Larsen | H01M 8/0282 501/59 |
| 2010/0209802 A1 | 8/2010 | Armstrong et al. | |
| 2011/0129756 A1 | 6/2011 | Erikstrup | |
| 2012/0155062 A1 | 5/2012 | Nguyen et al. | |
| 2013/0130146 A1 | 5/2013 | Batawi et al. | |
| 2013/0216927 A1 | 8/2013 | Gottmann et al. | |
| 2013/0230644 A1 | 9/2013 | Armstrong et al. | |
| 2013/0230792 A1 | 9/2013 | Wilson et al. | |
| 2014/0057184 A1* | 2/2014 | Pillai | H01M 8/0263 429/410 |
| 2014/0127602 A1 | 5/2014 | Srivatsan et al. | |
| 2014/0127604 A1 | 5/2014 | Darga et al. | |
| 2014/0342267 A1 | 11/2014 | Parihar et al. | |
| 2015/0132679 A1 | 5/2015 | McElroy | |
| 2015/0147679 A1 | 5/2015 | Darga et al. | |
| 2015/0194682 A1 | 7/2015 | Ashary | |
| 2015/0244004 A1 | 8/2015 | Shivanath et al. | |
| 2018/0097250 A1 | 4/2018 | Brown | |
| 2019/0372132 A1 | 12/2019 | Gasda et al. | |

FOREIGN PATENT DOCUMENTS

| | | | | |
|---|---|---|---|---|
| CN | 103907233 A | 7/2014 | | |
| CN | 104769762 A | 7/2015 | | |
| JP | H02278664 A | 11/1990 | | |
| JP | H08115736 A | 5/1996 | | |
| JP | 10092446 A | 4/1998 | | |
| JP | 2004513500 A | 4/2004 | | |
| JP | 2007-161569 A | 6/2007 | | |
| JP | 2007161569 A | 6/2007 | | |
| KR | 20020084123 A * | 11/2002 | | H01M 8/0247 |
| WO | WO 2002-39528 A2 | 5/2002 | | |
| WO | WO-0239528 A2 * | 5/2002 | | H01M 8/0206 |

OTHER PUBLICATIONS

China National Intellectual Property Administration ("CNIPA") Office Communication and Search Report for PRC (China) Patent Application No. 201980035794.6, dated May 7, 2023, 12 pages.

Lin, Z. et al. "Steady State Simulation of YSZ Intermediate-temperature Fuel Cell," Journal of Electrochemistry: vol. 8: Iss. 4, (2002), Available at: https://jelectrochem.xmu.edu.cn/journal/vol8/iss4/7.

Taiwan Patent Office Communication and Search Report for Roc (Taiwan) Patent Office Application No. 108118571 dated May 5, 2023, 6 pages.

Office Communication for Japanese Patent Office, for Japanese Patent Application No. 2020-566848, dated Mar. 17, 2023, 4 pages.

\* cited by examiner

CROSS-FLOW INTERCONNECT AND FUEL CELL SYSTEM INCLUDING SAME

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to various embodiments of the present disclosure, provided is a cross-flow interconnect and a fuel cell stack including the same, the interconnect including: fuel inlets and outlets that extend through the interconnect adjacent to opposing first and second peripheral edges of the interconnect; an air side; and an opposing fuel side. The air side includes: an air flow field including air channels that extend in a first direction, from a third peripheral edge of the interconnect to an opposing fourth peripheral edge of the interconnect; and riser seal surfaces disposed on two opposing sides of the air flow field and in which the fuel inlets and outlets are formed. The fuel side includes: a fuel flow field including fuel channels that extend in a second direction substantially perpendicular to the first direction, between the fuel inlets and outlets; and a perimeter seal surface surrounding the fuel flow field and the fuel inlets and outlets.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Figures 1A, 1B:
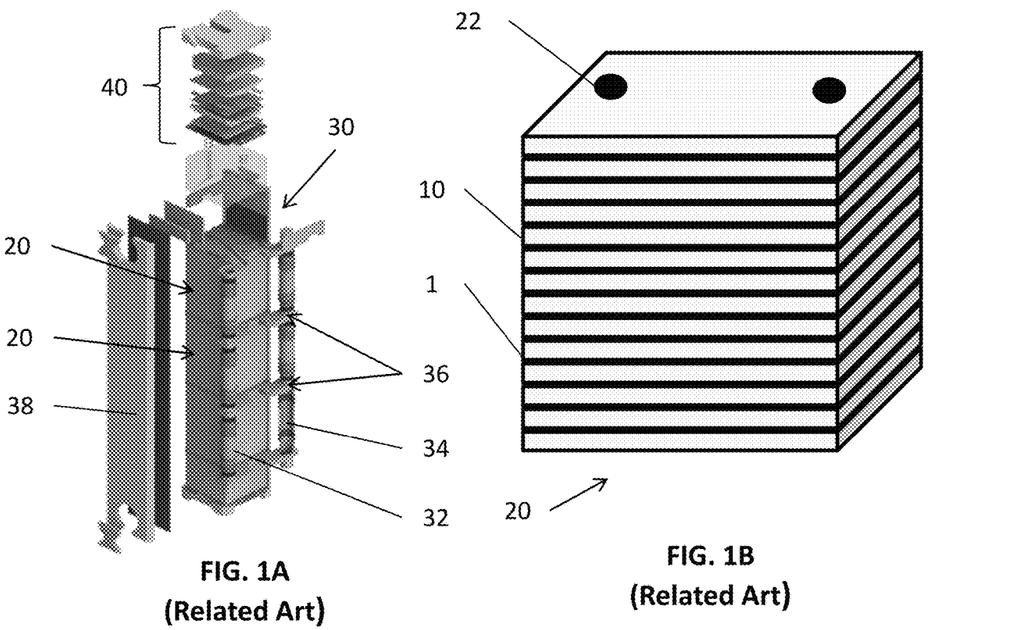
FIG. 1A is a perspective view of a conventional fuel cell column.
FIG. 1B is a perspective view of one counter-flow solid oxide fuel cell (SOFC) stack included in the column of FIG. 1A.
Figure 1C:
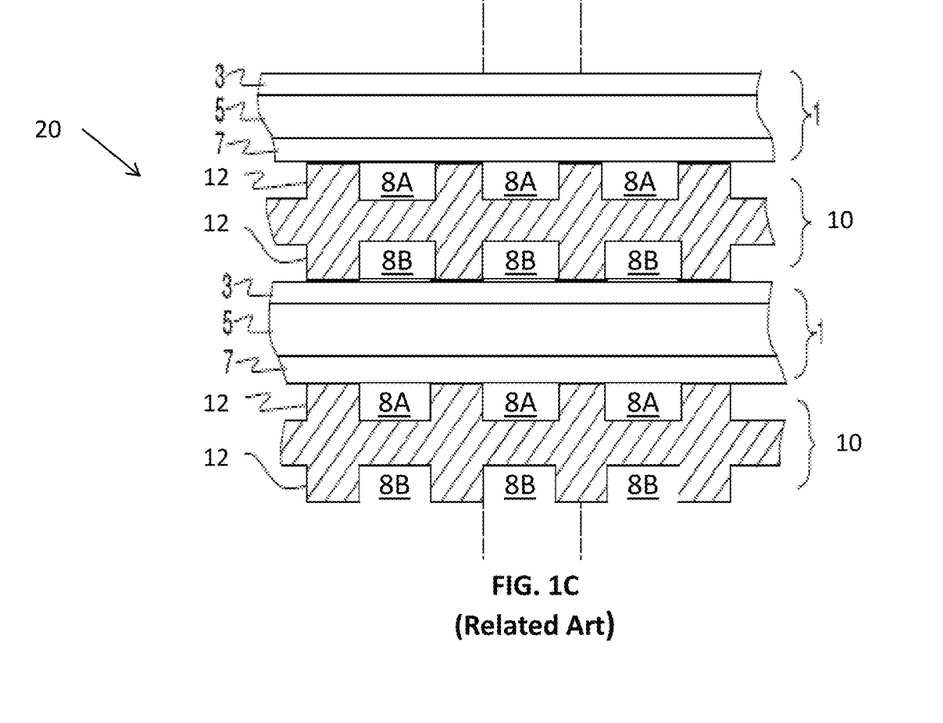
FIG. 1C is a side cross-sectional view of a portion of the stack of FIG. 1B.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2A:
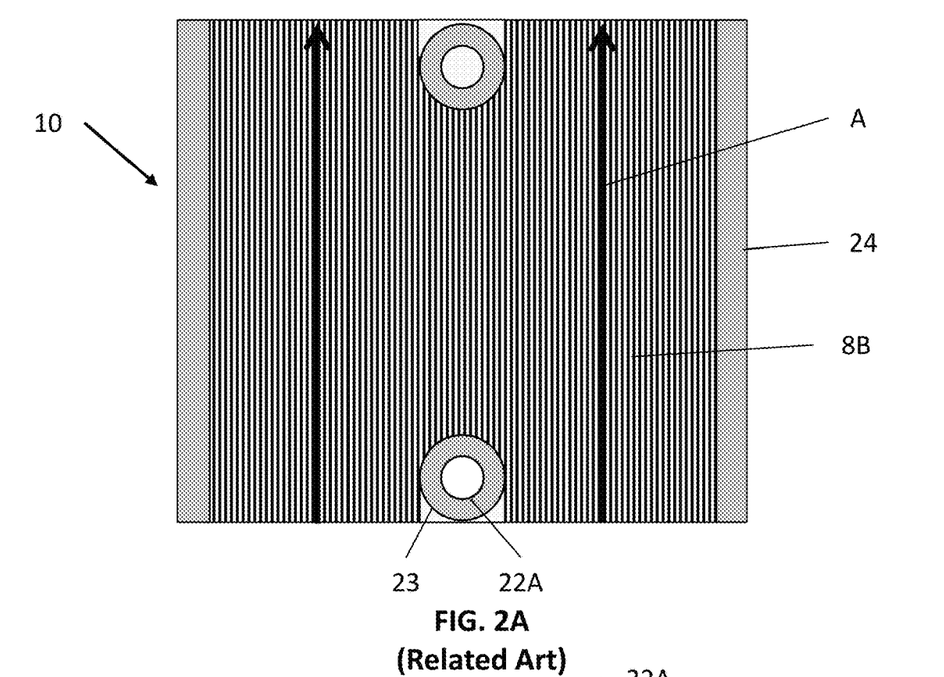
FIG. 2A is a top view of the air side of a conventional interconnect of the stack of FIG. 1B.
Figure 2B:
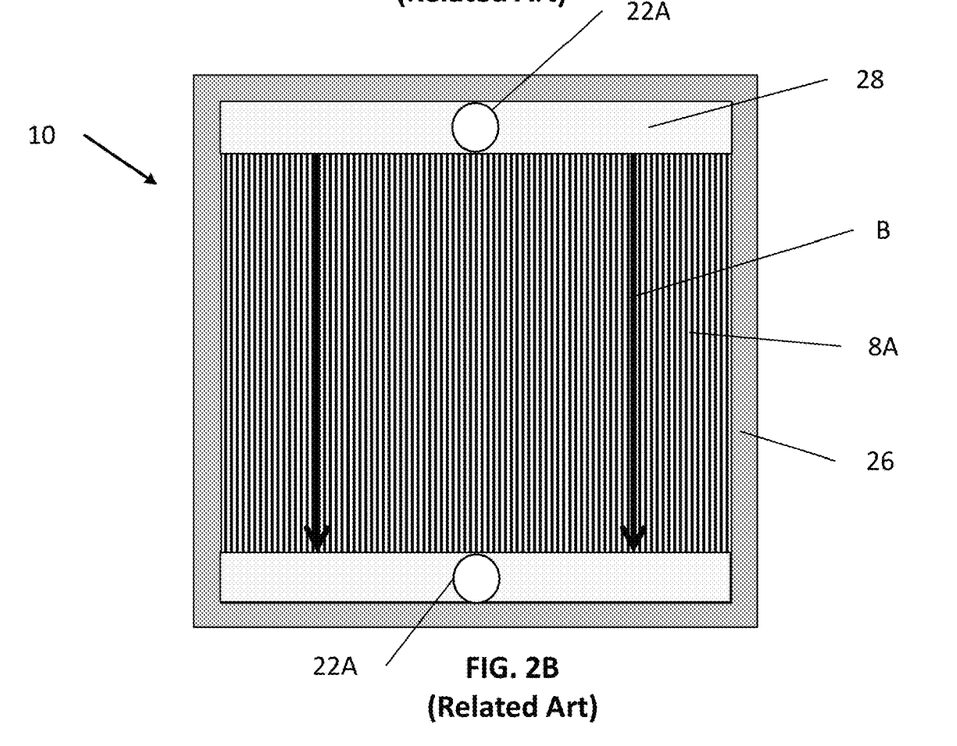
FIG. 2B is a top view of the fuel side of the conventional interconnect.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Cross-Flow Fuel Cell Systems

Figures 3A, 3B, 3C, 3D:
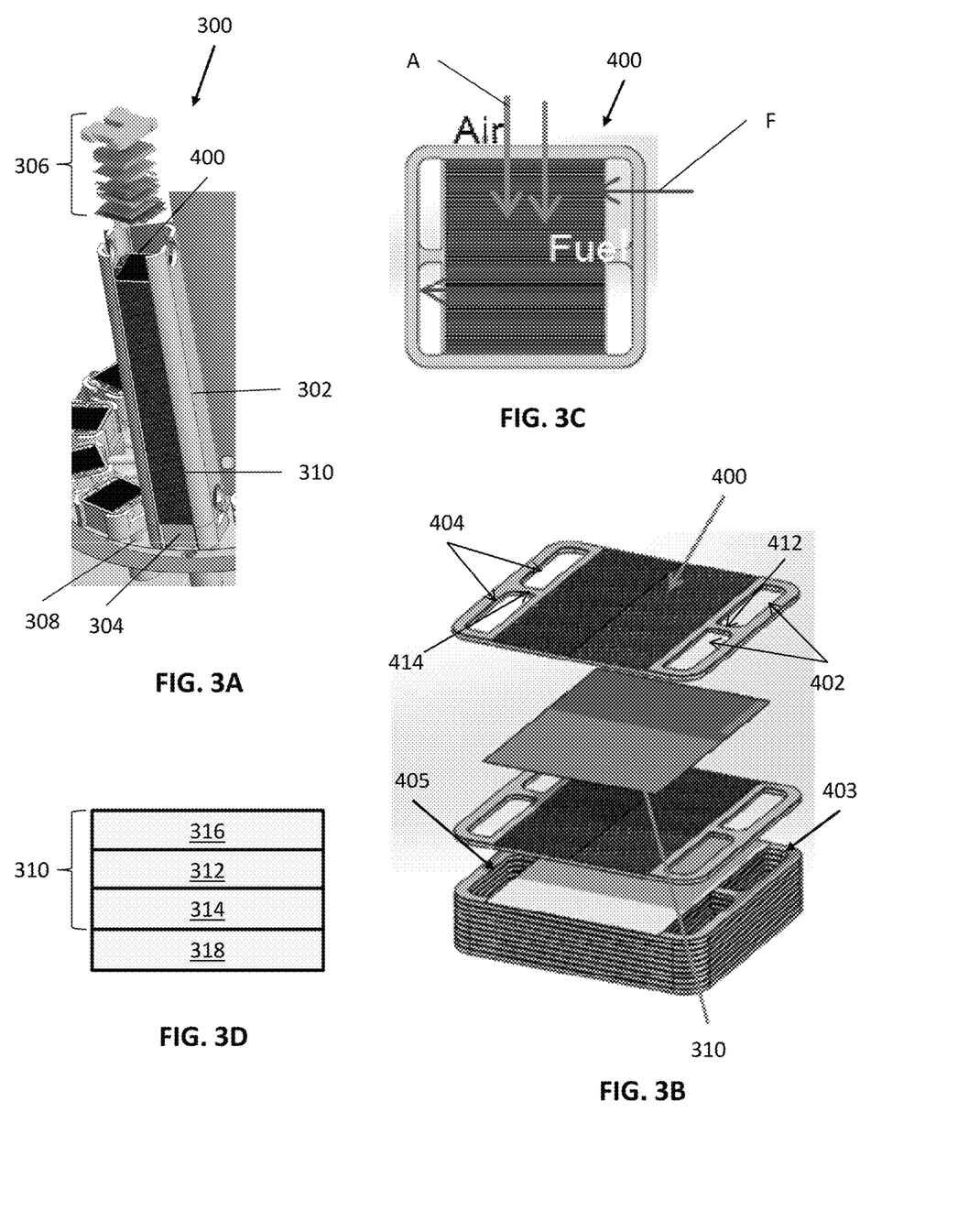
FIG. 3A is a perspective view of a fuel cell stack, according to various embodiments of the present disclosure.
FIG. 3B is an exploded perspective view of a portion of the stack of FIG. 3A.
FIG. 3C is a top view of the fuel side of an interconnect included in the stack of FIG. 3A.
FIG. 3D is a schematic view of a fuel cell included in the stack of FIG. 3A.

FIG. 3A is a perspective view of a fuel cell stack 300, according to various embodiments of the present disclosure, FIG. 3B is an exploded perspective view of a portion of the stack 300 of FIG. 3A, FIG. 3C is a top view of the fuel side of an interconnect 400 included in the stack 300, and FIG. 3D is a schematic view of a fuel cell included in the stack 300.

Referring to FIGS. 3A-3D, the fuel cell stack 300, which may also be referred to as a fuel cell column because it lacks ASP's, includes multiple fuel cells 310 that are separated by interconnects 400, which may also be referred to as gas flow separator plates or bipolar plates. One or more stacks 300 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through holes, such as the fuel holes of conventional fuel cells. Therefore, the fuel cell 310 avoids cracks that may be generated due to the presence of such through holes.

An upper most interconnect 400 and a lowermost interconnect 400 of the stack 300 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the stack 300 does not include ASPs and the end plates associated therewith, the stack 300 may include only two end plates. As a result, stack dimensional variations associated with the use of intra-column ASPs may be avoided.

The stack 300 may include side baffles 302, a fuel plenum 304, and a compression assembly 306. The side baffles 302 may be formed of a ceramic material and may be disposed on opposing sides of the fuel cell stack 300 containing stacked fuel cells 310 and interconnects 400. The side baffles 302 may connect the fuel plenum 304 and the compression assembly 306, such that the compression assembly 306 may apply pressure to the stack 300. The side baffles 302 may be curved baffle plates, such each baffle plate covers at least portions of three sides of the fuel cell stack 300. For example, one baffle plate may fully cover the fuel inlet riser side of the stack 300 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the stack 300. The curved baffle plates provide an improved air flow control through the stack compared to the conventional baffle plates 38 which cover only one side of the stack. The fuel plenum 304 may be disposed below the stack 300 and may be configured to provide a hydrogen-containing fuel feed to the stack 300, and may receive an anode fuel exhaust from the stack 300. The fuel plenum 304 may be connected to fuel inlet and outlet conduits 308 which are located below the fuel plenum 304.

Each interconnect 400 electrically connects adjacent fuel cells 310 in the stack 300. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include through-holes configured for fuel distribution. For example, the interconnects 400 may include one or more fuel inlets 402 and one or more fuel outlets 404, which may also be referred to as anode exhaust outlets 404. The fuel inlets and outlets 402, 404 may be disposed outside of the perimeter of the fuel cells 310. As such, the fuel cells 310 may be formed without corresponding through holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the stack 300 to form one or more fuel inlet risers 403. The fuel outlets 404 of adjacent interconnects 400 may be aligned in the stack 300 to form one or more fuel outlet risers 405. The fuel inlet riser 403 may be configured to distribute fuel received from the fuel plenum 304 to the fuel cells 310. The fuel outlet riser 405 may be configured to provide anode exhaust received from the fuel cells 310 to the fuel plenum 304.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the stack 300 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating layer in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as an (Mn, Co)$_3$O$_4$ spinel (MCO), can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as (Mn, Co)$_3$O$_4$ may be used. In other embodiments, a mixed layer of LSM and MCO, or a stack of LSM and MCO layers may be used as the coating layer.

Figure 4A:
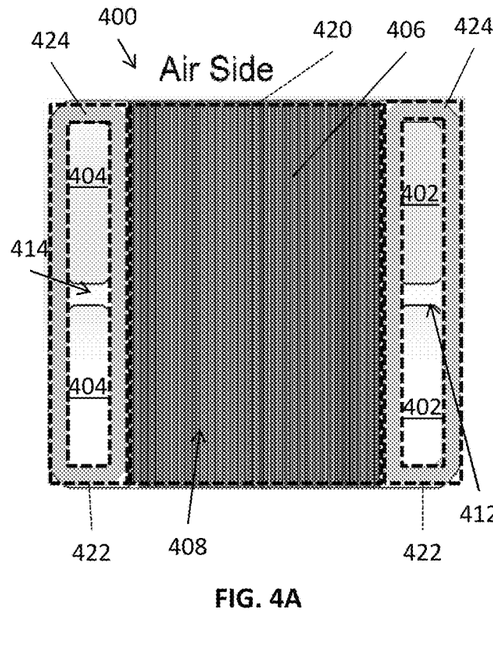
FIGS. 4A and 4B are plan views showing, respectively, an air side and a fuel side of the cross-flow interconnect of FIG. 3C, according to various embodiments of the present disclosure.
Figure 4B:
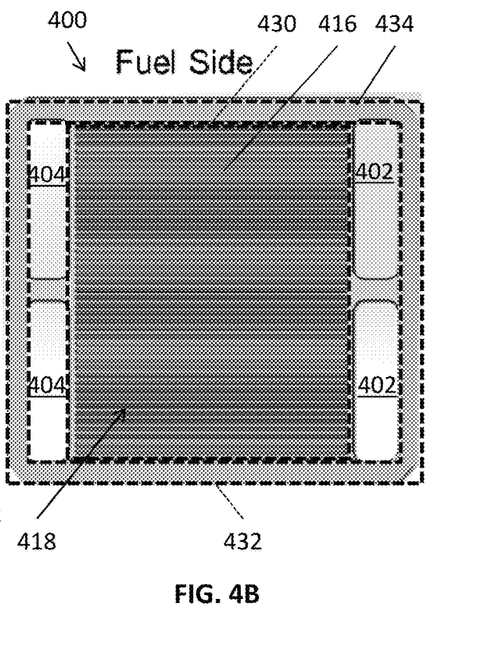

FIGS. 4A and 4B are plan views showing, respectively, an air side and a fuel side of the cross-flow interconnect 400, according to various embodiments of the present disclosure. Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a stack 300, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell stack 300 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

In some embodiments, the seals 424, 434 may be formed of a silicate glass seal material comprising SiO$_2$, BaO, CaO, Al$_2$O$_3$, K$_2$O, and/or B$_2$O$_3$. For example, the seal material may include, by weight: SiO$_2$ in an amount ranging from about 40% to about 60%, such as from about 45% to about 55%; BaO in an amount ranging from about 10% to about 35%, such as from about 15% to about 30%; CaO in an amount ranging from about 5% to about 20%, such as from about 7% to about 16%; Al$_2$O$_3$ in an amount ranging from about 10% to about 20%, such as from about 13% to about 15%; and B$_2$O$_3$ in an amount ranging from about 0.25% to about 7%, such as from about 0.5% to about 5.5%. In some embodiments, the seal material may additionally include K$_2$O in an amount ranging from about 0.5% to about 1.5%, such as from about 0.75% to about 1.25%.

In some embodiments, the seals 424, 434 may be formed of a silicate glass seal material comprising SiO$_2$, B$_2$O$_3$, Al$_2$O$_3$, CaO, MgO, La$_2$O$_3$, BaO, and/or SrO. For example, the seal material may include, by weight: SiO$_2$ in an amount ranging from about 30% to about 60%, such as from about 35% to about 55%; B$_2$O$_3$ in an amount ranging from about 0.5% to about 15%, such as from about 1% to about 12%; Al$_2$O$_3$ in an amount ranging from about 0.5% to about 5%, such as from about 1% to about 4%; CaO in an amount ranging from about 2% to about 30%, such as from about 5% to about 25%; MgO in an amount ranging from about 2% to about 25%, such as from about 5% to about 20%; and La$_2$O$_3$ in an amount ranging from about 2% to about 12%, such as from about 5% to about 10%. In some embodiments, the seal material may additionally include BaO in an amount ranging from about 0% to about 35%, such as from about 0% to about 30%, or from about 0.5% to about 30%, including about 20% to about 30%, and/or SrO in an amount ranging from about 0% to about 20%, such as from about 0% to about 15%, of from about 0.5% to about 15%, including about 10% to about 15%. In some embodiments, the seal material may additionally include at least one of BaO and/or SrO in a non-zero amount such as at least 0.5 wt. %, such as both of BaO and SrO in a non-zero amount, such at least 0.5 wt. %.

Figure 5A:
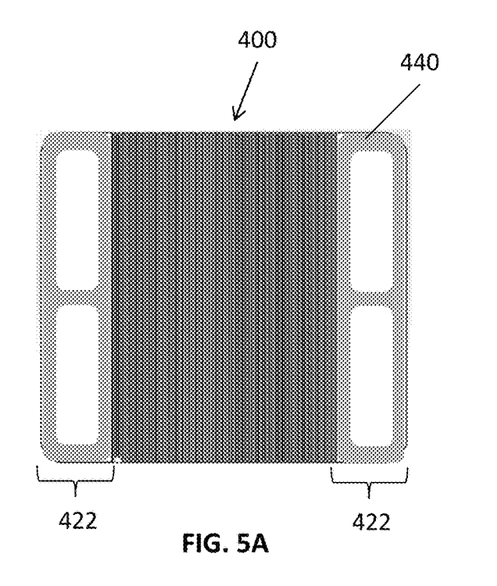
FIG. 5A is a plan view showing the air side of the interconnect of FIG. 3C.
Figure 5B:
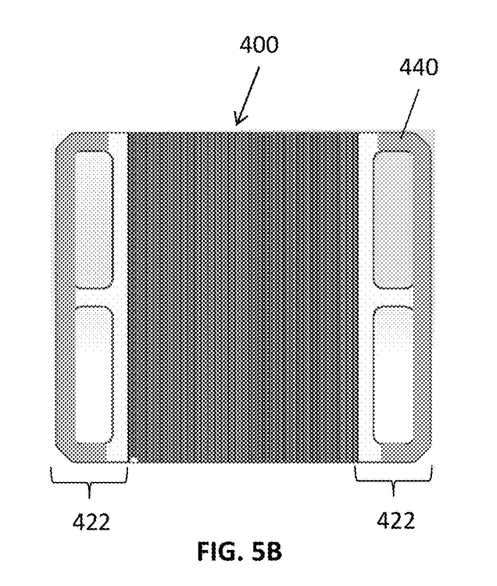
FIG. 5B is a plan view showing a modified version of the interconnect of FIG. 5A.

FIG. 5A is a plan view showing the air side of the interconnect 400 without the riser seals 424, according to various embodiments of the present disclosure, and FIG. 5B is a plan views showing a modified version of the interconnect 400 of FIG. 5A.

In conventional counter flow fuel cell system designs, the fuel cell electrolytes fully cover the interconnects, such that the fuel cell electrolytes operate as dielectric layers between adjacent interconnects. In a crossflow design, interconnects may extends past the perimeter of the fuel cells. This can potentially result in electrical shorting between interconnects, if the stack is tilted, or if seals become conductive over time.

Referring to FIGS. 5A and 5B, the interconnect 400 may include dielectric layers 440 disposed on the riser seal surfaces 422. For example, as shown in FIG. 5A, each dielectric layer 440 may be annular and may cover all, or substantially all, of the corresponding riser seal surface 422. For example, in the embodiment of FIG. 5A, the dielectric layers 440 may be D-shaped and may have substantially the same shape as the riser seals 424 shown in FIG. 4A disposed thereon. In other embodiments, as shown in FIG. 5B, the dielectric layers 440 may be C-shaped and may cover only a portion of the corresponding riser seal surface 422, such as a portion adjacent to the outer perimeter of the interconnect 400. The dielectric layers 440 form an electrically insulating barrier between adjacent interconnects 400 and prevent electrical shorting if a corresponding stack is tilted or if a seal becomes conductive.

The dielectric layers 440 may comprise alumina, zircon (zirconium silicate), silicon carbide, crystalline glass (e.g., quartz or a glass-ceramic), or other high temperature dielectric materials. In some embodiments, the dielectric layers 440 may include a corrosion barrier material or layer. For example, the dielectric layers 440 may comprise a composite material comprising a corrosion-tolerant glass, alumina, zircon, or the like. For example, in some embodiments the dielectric layers 440 comprise a glass ceramic layer formed from a substantially glass barrier precursor layer containing at least 90 wt. % glass (e.g., 90-100 wt. % glass, such as around 99 to 100 wt. % amorphous glass and 0 to 1 wt. % crystalline phase) applied to a surface of interconnect 400 in the SOFC stack 300. In one embodiment, the glass barrier precursor layer containing at least 90 wt. % glass comprises: 45-55 wt. % silica ($SiO_2$); 5-10 wt. % potassium oxide ($K_2O$); 2-5 wt. % calcium oxide (CaO); 2-5 wt. % barium oxide (BaO); 0-1 wt. % boron trioxide ($B_2O_3$); 15-25 wt. % alumina ($Al_2O_3$); and 20-30 wt. % zirconia ($ZrO_2$) on an oxide weight basis.

In some embodiments, the glass barrier precursor layer comprises least 90% glass (e.g., 90-100 wt. % glass, such as around 99 to 100 wt. % amorphous glass and 0 to 1 wt. % crystalline phase) by weight. For example, the glass barrier precursor layer may comprise, on an oxide weight basis: from about 30% to about 60%, such as from about 35% to about 55%, silica ($SiO_2$); from about 0.5% to about 15%, such as from about 1% to about 12%, boron trioxide ($B_2O_3$); from about 0.5% to about 5%, such as from about 1% to about 4%, alumina ($Al_2O_3$); from about 2% to about 30%, such as from about 5% to about 25%, calcium oxide (CaO); from about 2% to about 25%, such as from about 5% to about 20% magnesium oxide (MgO); from about 0% to about 35%, such as from about 20% to about 30%, barium oxide (BaO); from about 0% to about 20%, such as from about 10% to about 15%, strontium oxide (SrO); and from about 2% to about 12%, such as from about 5% to about 10%, lanthanum oxide ($La_2O_3$). In some embodiments, the glass barrier precursor material may include at least one of BaO and/or SrO in a non-zero amount such as at least 0.5 wt. %, such as both of BaO and SrO in a non-zero amount, such at least 0.5 wt. %.

In some embodiments, some or all of a LSM/MCO coating may be removed on the air side of the interconnect 400 in the area around the riser seal 424, to prevent Mn diffusion from the LSM/MCO material into the riser seal 424, and thereby prevent the riser seal 424 from becoming conductive. In other embodiments, the riser seals 424 may be formed of crystalline glass or glass-ceramic materials that do not react with the LSM/MCO coating, such as the borosilicate glass-ceramic compositions discussed above.

The dielectric layer 440 can be formed from freestanding layers, such as a tape cast and sintered layer, and may be disposed between interconnects 400 during fuel cell stack assembly. In other embodiments, the dielectric layers 440 may be formed by dispersing a dielectric material in an ink, paste, or slurry form, and subsequently screen printed, pad printed, aerosol sprayed onto the interconnect 400. In some embodiments, the dielectric layer 440 may be formed by a thermal spraying process, such as an atmospheric plasma spray (APS) process. For example, the dielectric layer 440 may include alumina deposited by the APS process.

The dielectric layer 440 may be deposited directly on the interconnect 400. For example, the dielectric layer 440 may be disposed directly on the riser seal surfaces 422 (i.e., parts of the interconnect 400 around the fuel inlets and outlets 402, 404 in areas that will be covered by the riser seals 424 and that are not covered by the LSM/MCO coating, except for a small area of overlap (e.g., seam) where the dielectric layer 440 overlaps with a LSM/MCO coating where the riser seal surface 422 meets the air flow field 420, so as to prevent Cr evaporation from an exposed surface of the interconnect 400. Thus, the LSM/MCO coating is located on the interconnect 400 surface in the air flow field 420 containing air channels 408 and ribs 406, but not in the riser seal surface 422 of the interconnect 400 surrounding the fuel inlets and outlets 402, 404. The dielectric layer 440 is located on the riser seal surface of the interconnect 400 in the area surrounding the fuel inlets and outlets 402, 404 that is not covered by the LSM/MCO coating and on the edge of the LSM/MCO coating in the air flow field 420 adjacent to the riser seal surface 422. Alternatively, the dielectric layer 440 may be omitted and there is no dielectric layer 440 deposited around the fuel riser openings.

Figure 6A:
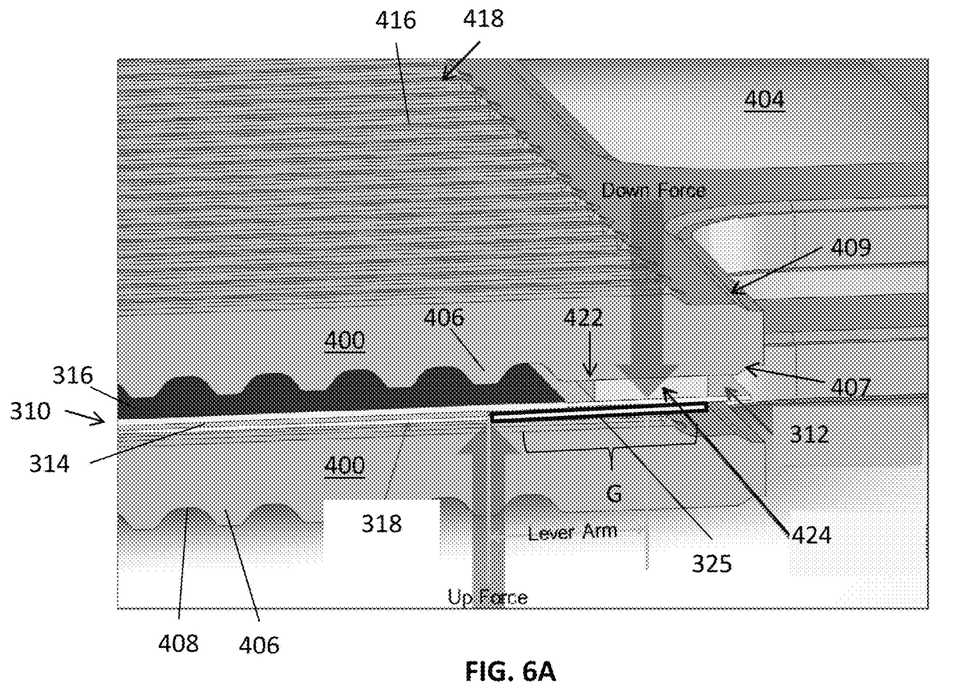
FIG. 6A is a sectional perspective view of two interconnects of FIGS. 4A and 4B, and a fuel cell as assembled in the fuel cell stack of FIG. 3A, according to various embodiments of the present disclosure.
Figure 6B:
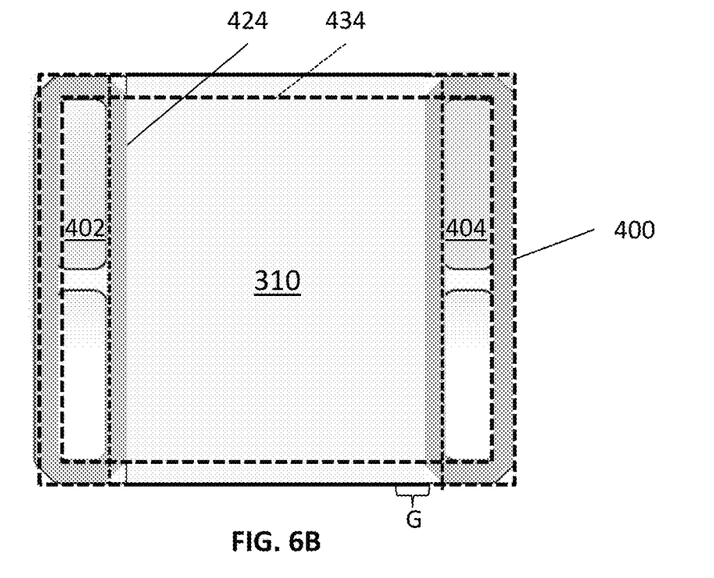
FIG. 6B is a top view showing the overlap of the fuel cell and seals on the fuel side of an interconnect of FIG. 6A.

FIG. 6A is a sectional perspective view of two interconnects 400 of FIGS. 4A and 4B, and a fuel cell 310 as assembled in the fuel cell stack 300 of FIG. 3A, according to various embodiments of the present disclosure. FIG. 6B is a top view showing the overlap of the fuel cell 310, and seals 424, 434, on the fuel side of an interconnect 400 of FIG. 6A.

Referring to FIGS. 4A, 4B, 6A, and 6B, when assembled in a fuel cell stack, the fuel cell 310 is disposed between the interconnects 400, so as to face the air flow field 420 and the fuel flow field 430 of each interconnect 400. The riser seals 424 may contact first opposing sides of the air side of the fuel cell 310, and the perimeter seal 434 may contact second opposing sides of the fuel side of the fuel cell 310. As such, portions of the seals 424, 434 may be thicker outside of the perimeter of the fuel cell 310 than inside of the perimeter of (e.g., overlapping with) the fuel cell 310. Portions of the perimeter seal 434 adjacent the fuel inlets and outlets 402, 404 may overlap with corresponding portions of the riser seals 424. In addition, portions of the fuel cell 310 may be disposed between overlapping portions of the seals 424, 434, such as at corners of the fuel cell 310. As such, a combined thickness of the overlapped portions of the fuel cell 310 and seals 424, 434 may be greater than a thickness of the overlapped portions of the seals 424, 434.

In order to account for this thickness variation and/or properly seal the fuel cell stack, the thickness of portions of the interconnects 400 that are disposed outside of the perimeter of the fuel cell 310 may be increased by an amount equal to the after-sintering thickness of the fuel cell 310 (e.g., the after-sintering thickness of the electrodes 314, 316, electrolyte 312, and nickel mesh 318 as shown in FIG. 3D).

Since the seals 424, 434 overlap the corners of the fuel cell 310, a gap G may be formed between the corners, below each of the riser seals 424 (e.g., below the electrolyte 312). When the stack 300 is compressed, a down force may be transmitted through the interconnect 400 and riser seals 424, and into the unsupported edges of the fuel cell 310 adjacent the gaps G, which may create a leaver arm effect, due to the adjacent gaps G below the riser seals 424.

Conventionally, the electrodes and conductive layer of a fuel cell are only disposed on an active region of the fuel cell (e.g., where the fuel cell is exposed to fuel and air). In other words, seals may be disposed on portions of the electrolyte that are not covered with the electrodes and/or conductive layer.

According to various embodiments of the present disclosure, in order to support the edges of the fuel cell 310, the conductive layer 318 (e.g., nickel mesh) may be extended into the gaps G. In some embodiments, the anode 314 and/or cathode 316 may also be extended to cover the electrolyte below the riser seals 424, in combination with extending the conductive layer 318 into the gaps G. In other embodiments, one or more electrolyte reinforcement layers 325 may be formed on one or both sides of the electrolyte 312 below the riser seals 424, and may be formed of a ceramic material, such as alumina and/or zirconia. The electrolyte reinforcement layer 325 may have substantially the same thickness as the anode 314 and/or cathode 316, and may further support the edge of the fuel cell 310 in conjunction with the conductive layer 318. In some embodiments, the electrolyte reinforcement layer 325 may be disposed on the cathode-side of the fuel cell 310 and may be formed of a chromium getter material, such as manganese cobalt oxide spinel. As such, the electrolyte reinforcement layer 325 may be configured to remove chromium from air supplied to the fuel cell 310.

The fuel cell stack 300 and/or components thereof may be conditioned and/or sintered. "Sintering" includes processes for heating, melting and/or reflowing a glass or glass-ceramic seal precursor materials to form seals in a fuel cell stack, which may be performed at elevated temperature (e.g., 600-1000° C.) in air/inert gas. "Conditioning" includes processes for reducing a metal oxide (e.g., nickel oxide) in an anode electrode to a metal (e.g., nickel) in a cermet electrode (e.g., nickel and a ceramic material, such as a stabilized zirconia or doped ceria) and/or heating the stack 300 during performance characterization/testing, and may be performed at elevated temperature (e.g., 750-900° C.) while fuel flows through the stack. The sintering and conditioning of the fuel cell stack 300 may be performed during the same thermal cycle (i.e., without cooling the stack to room temperature between sintering and conditioning).

During such high-temperature operations, if too much pressure is applied to the riser seals 424, the riser seals 424 may be forced out of the riser seal surfaces 422, past the edges of the fuel cell 310, and into the fuel inlets 402, the fuel outlets 404, and/or the fuel channels 418 of an adjacent interconnect 400. In severe cases, this can increase the pressure drop of fuel flow, cause fuel maldistribution from cell to cell, or even render the stack 300 unusable.

Accordingly, in some embodiments, the riser seal surfaces 422 may be recessed with respect to the tops of the air-side ribs 406. In other words, when the air side of the interconnect 400 is viewed from above, the riser seal regions may be lower than the tips of the ribs 406. For example, the riser seal surfaces 422 may be recessed by from about 30 to about 50 µm with respect to a plane extending across the tips of the ribs 406. Accordingly, when the fuel cell 310, which may have a thickness ranging from about 20-30 µm, for example, is brought into contact with the air side of the interconnect 400, the ribs 406 contact with the fuel cell 310, and a space or recess may be formed between the fuel cell 310 and each of the riser seal surfaces 422.

When the fuel cell stack 300 is assembled, the recessed riser seal surfaces 422 provide additional space to accommodate the riser seals 424. As a result, the force applied to the riser seals 424 may be reduced, such that the riser seals 424 may remain in the riser seal surfaces 422 during high temperature operations such as sintering.

In some embodiments, one or more components of the fuel cell 310 may be made thicker, such as by contact printing to form thicker contact printed fuel cell layers. This increased thickness may also reduce the force applied to the riser seals 424. In some embodiments, a thicker fuel cell 310 may be used in conjunction with the recessed riser seal surface 422.

In various embodiments, a chamfer 407 may be added to the fuel inlets 402 and/or the fuel outlets 404 on the air side of the interconnect 400. The chamfer 407 may operate to capture seal material that has escaped from the riser seal surface 422. Chamfers 409 may also be added to other edges of the interconnect 400, such as edges of the inlets and outlets 402, 404 on the fuel side of the interconnect 400 and/or perimeter edges of the interconnect 400, for example. The chamfers may provide benefits during formation of the interconnect 400, such as preventing chipping during powdered metallurgy operations used to form the interconnect 400.

The thermal gradient across the fuel cell 310 during steady state operations is a function of the operating condition, including $i^2R$ heating, endothermic steam reformation (mainly at fuel inlets 402), and convective cooling (e.g., the coolest air contacts the inlets of the air channels 408), as well as physical properties of the stack 300, such as thermal conductivity and thickness of the interconnects 400. As a result, certain portions of the fuel cell 310 may be relatively hot during steady-state operations, such as the corner (hot corner) adjacent to the fuel inlet 402 and the air channel 408 outlets at the fuel in/air out corner. Portions of the seals 424, 434 adjacent to this corner may become porous and/or leak, due to evaporation at the relatively elevated temperature at this corner, particularly when a barium-containing borosilicate glass seal material is used.

According to various embodiments, the seals 424, 434 may be formed of glass materials that are stable at high temperatures, such as the glass materials disclosed in Table 1 above. In the alternative, the thickness of the interconnects 400 may be increased to improve thermal conduction in the in-plane direction. The increased thickness may reduce the thermal gradient of the interconnects 400 and thereby reduce the temperature of the hot corner. The thickness of the interconnects 400 may be increased without increasing the overall thickness of the stack 300, as compared to a conventional stack, since the stack does not require the anode splitter plates of the conventional stack.

Figure 7:
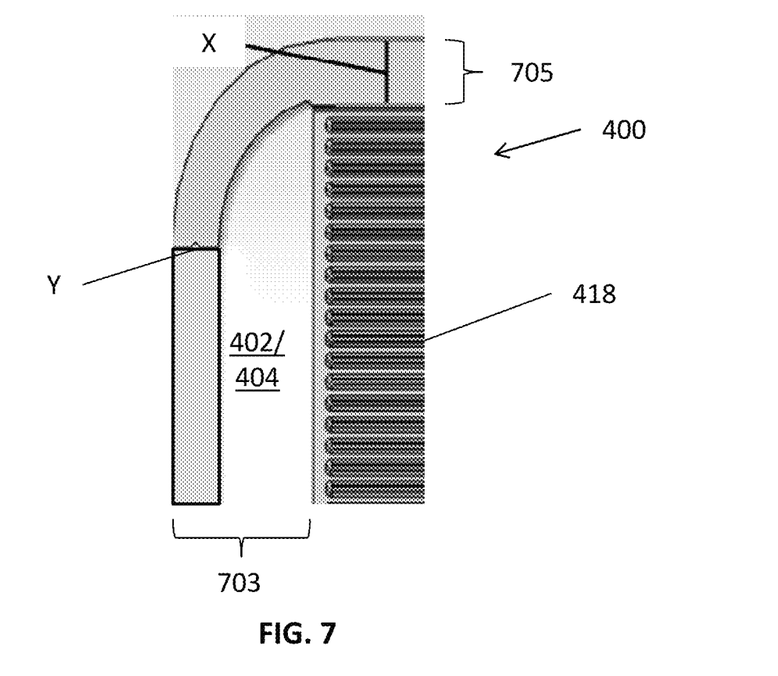
FIG. 7 is a fuel side view of a portion of an interconnect, according to various embodiments of the present disclosure.

FIG. 7 is a fuel side view of a portion of an interconnect 400, according to various embodiments of the present disclosure. Referring to FIG. 7, a portion of the interconnect 400 that surrounds the outer edges of the fuel inlets 402 may be referred to as a flange 703. Another flange (not shown) may be similarly disposed around the outer edges of the fuel outlets 404. The flange 703 may extend from edge portions 705 of the interconnect 400. The flanges 703 and edge portions 705 may include the perimeter seal surface 432 shown in FIG. 4B.

In some embodiments, a width X of the edge portion 705 may be greater than a width Y of the flange 703. For example, the width X may range from about 10% to about 40% wider than the width Y.

Various embodiments of the present disclosure provide fuel cell systems that include cross-flow interconnects. The cross-flow channel design also de-couples the constraints of prior co-flow designs that require a certain relationship be maintained between air side and fuel side channels, to maintain uniform thickness and density for quality purposes.

The cross-flow channel designs also provide the capability to optimize fuel side flow and air side flow independently for further performance improvement (e.g., allow for different channel numbers, different pitch, different channel/rib shape, etc.). The cross-flow interconnects may also be designed to minimize powder metallurgy tool wear, and maximize rib tip width to provide larger top flat region for better assembly robustness as well as provide better and more stable contact region for the electrolyte/cell. The bulk thickness of the interconnects may also be increased, based on overall height constraint of a fuel cell stack, which will improve manufacture quality and minimize part-to-part variation. The fuel inlets and outlets may also be design to ensure uniform fuel flow to the fuel cells, which may also ensure uniform power density and simplify the kitting requirements for stack build processes.

Because the density gradients and lack of support for the electrolyte in prior fuel cell system designs are primarily driven by the existence of the fuel plenum, one aspects of the present disclosure allows for the activation of the area otherwise taken up by a fuel plenum, thus increasing the overall active area and power output. Aspects of the present disclosure also allow for the reduction of stack fuel pressure drop, resulting in better/uniform fuel utilization. The size of the fuel inlets and outlets may be configured to provide sufficient fuel flow for the entire stack and may also allow for the elimination of external stack fuel manifolds, ASP's and subassemblies of prior fuel cell systems. In addition, since fuel cell columns may be formed of a single stack of fuel cells, stack to stack interfaces, which are the weakest region on conventional systems and contribute to significant failures in stack yield and field performance, may be eliminated.

While solid oxide fuel cell interconnects, end plates, and electrolytes are described above in various embodiments, embodiments can include any other fuel cell interconnects or end plates, such as molten carbonate, phosphoric acid or PEM fuel cell electrolytes, interconnects or end plates, or any other shaped metal or metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell stack, comprising:
   interconnects stacked over one another;
   fuel cells disposed between the interconnects, facing fuel and air flow fields of adjacent interconnects;
   a fuel inlet riser at least partially defined by the inlets of the interconnects and configured to provide fuel to the fuel flow fields;
   a fuel outlet riser at least partially defined by fuel outlets of the interconnects and configured to receive anode exhaust from the fuel flow fields;
   riser seals disposed on a riser seal region of each interconnect and configured to prevent fuel in the fuel inlet and outlet risers from entering the air flow fields; and
   perimeter seals disposed on a perimeter seal region of each interconnect and configured to prevent air from entering the fuel flow fields;
   wherein the riser and perimeter seals are formed of a seal material comprising, by weight:
   $SiO_2$ in an amount ranging from 35% to about 55%;
   $B_2O_3$ in an amount ranging from about 0.5% to about 15%;
   $Al_2O_3$ in an amount ranging from about 0.5% to about 5%;
   CaO in an amount ranging from about 5% to about 30%;
   MgO in an amount ranging from about 2% to about 25%;
   $La_2O_3$ in an amount ranging from about 2% to about 12%; and
   at least 0.5% of at least one of BaO and SrO.

2. The fuel cell stack of claim 1, wherein each fuel cell comprises:
   an electrolyte disposed between adjacent first and second interconnects;
   a cathode covering a first surface of the electrolyte and facing the air flow field of the first interconnect; and
   an anode covering an opposing second surface of the electrolyte and facing the fuel flow field of the second interconnect, wherein,
   adjacent manifold seals contact portions of the first surface of the electrolyte that are not covered by the cathode, and
   each fuel cell further comprises an electrolyte reinforcement layer that extends from the anode and overlaps with the manifold seals in a stacking direction of the interconnects.

3. The fuel cell stack of claim 2, wherein:
   the fuel cells comprise solid oxide fuel cells;
   the electrolyte reinforcement layer comprises a ceramic material; and
   a coefficient of thermal expansion of the interconnects is within +/−10% of a coefficient of thermal expansion of the fuel cells.

4. The fuel cell stack of claim 1, wherein the fuel cells are free of through holes.

5. The fuel cell stack of claim 1, further comprising conductive layers disposed between the fuel cells and adjacent fuel flow fields, wherein a portion of each conductive layer extends beyond the adjacent flow field and overlaps with an adjacent manifold seal in a stacking direction of the interconnects.

6. The fuel cell stack of claim 1, wherein the fuel cell stack comprises at least 40 fuel cells and does not comprise an anode splitter plate.

7. The fuel cell stack of claim 1, further comprising curved ceramic baffle plates disposed on opposing sides of the fuel cell stack that curve around edges of the fuel cell stack.

8. The fuel cell stack of claim 1, wherein the seal material comprises, by weight:
BaO in an amount ranging from about 0.5% to about 35%;
SrO in an amount ranging from about 0.5% to about 20%;
or
BaO in an amount ranging from about 0.5% to about 35% and SrO in an amount ranging from about 0.5% to about 20%.

9. The fuel cell stack of claim 1, further comprising:
dielectric layers disposed on riser seal surfaces of the interconnects in the riser seal regions; and
a coating layer comprising at least one of lanthanum strontium manganite (LSM) and (Mn, Co)$_3$O$_4$ spinel (MCO) located directly on air channels and ribs in the air flow field but not on the riser seal surfaces of the interconnect.

10. The fuel cell stack of claim 9, wherein the seal material comprises, by weight:
BaO in an amount ranging from about 20% to about 30%;
SrO in an amount ranging from about 10% to about 20%;
or
BaO in an amount ranging from about 20% to about 30% and SrO in an amount ranging from about 10% to about 20%.

11. The fuel cell stack of claim 10, wherein each dielectric layer comprises an alumina layer formed by atmospheric plasma spray directly on the corresponding riser seal surface of the interconnect and directly on only an edge portion of the coating layer located adjacent to the riser seal surface.

* * * * *